May 20, 1924.
R. W. COOK
1,494,830
PROCESS OF MANUFACTURING CELLULOSE ACETATE
Filed Aug. 20, 1923
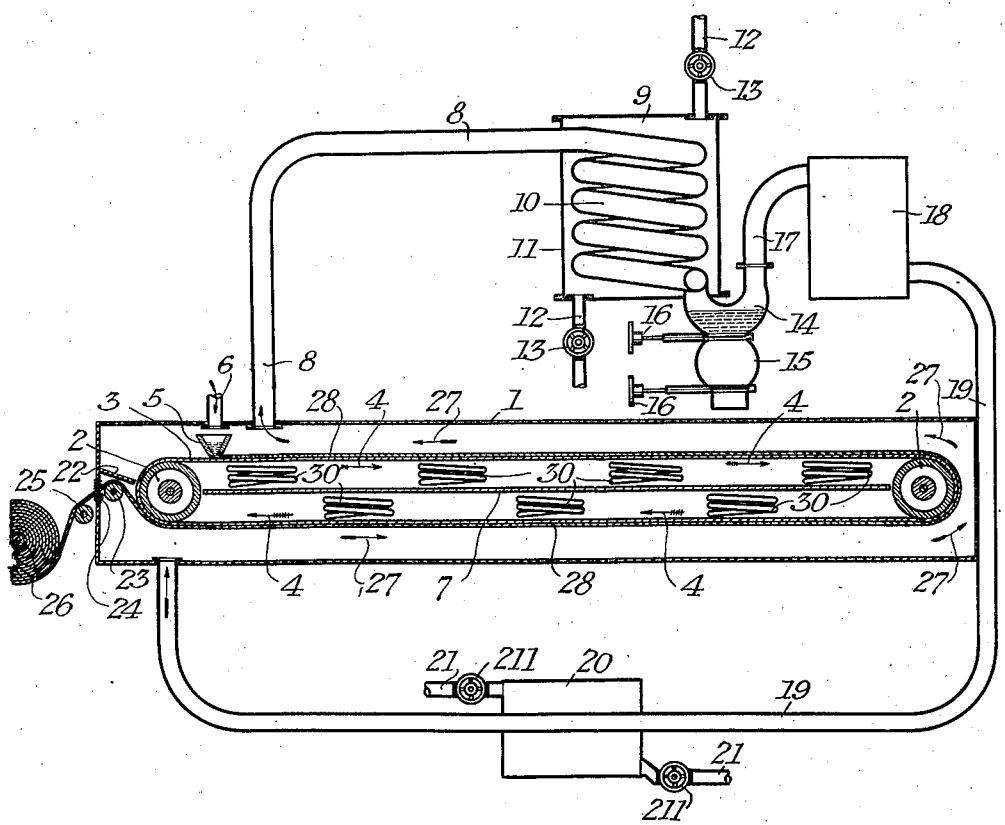
INVENTOR.
Robert W. Cook,
BY
ATTORNEY Patented May 20, 1924.

1,494,830

UNITED STATES PATENT OFFICE.

ROBERT W. COOK, OF ROCHESTER, NEW YORK.

PROCESS OF MANUFACTURING CELLULOSE ACETATE.

Application filed August 20, 1923. Serial No. 658,228.

*To all whom it may concern:*

Be it known that I, ROBERT W. COOK, a citizen of the United States of America, residing at Rochester, in the county of Monroe and State of New York, have invented certain new and useful Improvements in Processes of Manufacturing Cellulose Acetate, of which the following is a full, clear, and exact specification.

This invention relates to the manufacture of cellulose acetate. One object of the invention is to substantially lessen the cost of such manufacture. Another object is to provide a process in which acetic values, such as acetic acid and acetic anhydride can be quickly and inexpensively removed from the reaction mixture and recovered in concentrated form. Still another object of the invention is to provide a process in which the surface of the reaction mixture can be greatly increased to facilitate the rapid taking up of acetic values by means of a gaseous vehicle, such as air. A further object of the invention is to obtain the cellulose acetate from which the bulk of the acetic values have been removed in a form which is convenient to manipulate and has a large surface, relative to its mass, which facilitates further treatment by liquids, such as washes, reaction baths, and solvents. Other objects will hereinafter appear.

In the drawing the single figure is a diagrammatic side elevation, partly in vertical section, showing one form of apparatus in which my process may be conveniently carried out, the relative sizes of the parts being exaggerated for the sake of clearness.

Cellulose acetate is produced by the action of acetylating agents on cellulose in the presence of catalysts. The reaction mixture may, for example, comprise cellulose, acetic anhydride, acetic acid and sulfuric acid; and as the reaction progresses the mass contains the various reaction products, including cellulose acetate. An example of this general type of reaction mixture is given in detail in United States Reissue Patent No. 12,637, Miles, Apr. 23, 1907. The acetylating reaction at first forms a chloroform-soluble cellulose acetate. Then a hydrolyzing mixture, which includes a relatively small amount of water, is introduced and the reaction carried on until the cellulose acetate reaches the acetone-soluble stage. Before the hydrolyzing mixture acts the excess or unused acetic anhydride is converted into acetic acid by reacting with the proper amount of water. Sufficient water can be introduced in the hydrolyzing mixture to "kill" the acetic anhydride and cooperate in the conversion of the cellulose acetate.

At the end of the chloroform-soluble stage there remains a considerable amount of acetic values in the mixture, such as acetic anhydride and acetic acid (and in some cases acetyl chloride). When the acetone-soluble condition is produced, the acetic values are practically all in the form of acetic acid. These acetic values are relatively expensive and consequently the amount of them which is used up in the process has an important bearing upon the cost of the cellulose acetate which is produced. Their recovery substantially in condition for further acetylation, when effected inexpensively, lowers the total cost of the manufacturing operations and thereby cheapens the cost of the product.

The reaction mixture has heretofore been washed with considerable excess of water to free it from the acetic values. The latter are thus brought into dilute solutions from which they can be recovered only at an undesirable expense. Evaporating off the water and chemical reaction steps have proven to be complicated and cost too much.

I have found that the recovery of the acetic values can be carried out at greatly reduced expense and trouble by separating out at least the major portions of the acetic values from the reaction mixture by means of a gaseous vehicle, such as air, which takes up vapors of said values from the reaction mixture and then gives up the vapors at a suitable removal station or zone, where the vapors are condensed, absorbed or the like. I have, likewise, found that the recovery can be greatly speeded up and made more convenient by so shaping the reaction mixture that it has a large surface, relative to its mass, (forming it into thin films, for example) and then passing the gaseous vehicle over its surface.

Furthermore, I have discovered that repeatedly circulating the gaseous vehicle between the surface of the reaction mixture, where vapor is taken up, and a zone where vapor is removed, facilitates the recovery. High concentration of vapors in the gaseous vehicle is insured, with consequent ease in condensing or absorbing them. Since complete removal of the vapors of acetic values from the gas is not practical (solid acid forms and clogs the condenser at too low temperature) the gas would carry away and waste unextracted vapors if discharged into the atmosphere. Recirculation prevents such loss.

When the reaction mixture is formed into films, which harden or set as the acetic values are removed therefrom, I have found that such films are in convenient form for storage and for further treatment.

Of course, many forms of apparatus may be employed for carrying out my process, the one shown in the drawing being merely illustrative of one typical species. Within the substantially gastight casing 1 are located a pair of pulleys 2 over which passes a relatively broad belt 3 which may be composed of any suitable resistant material, such as silver plated copper, aluminum, rubber, etc. The pulleys and consequently the belt are driven by any source of power (not shown) in the direction indicated by the arrows 4. At one end of the apparatus adjacent one of the pulleys 2 there is located a hopper 5 into which the reaction mixture is fed through pipe 6. The reaction mixture is, of course, in a liquid state, by which I include even the very viscous forms. The hopper 5 may be of any of the well known types for spreading or depositing viscous liquids in film form on a belt running beneath it. Between the pulleys 2 is a partition wall 7 extending across the casing 1 for the purpose of directing the flow of the gaseous vehicle, which will be later described.

From the top of casing 1 adjacent the hopper 5 there is an exit pipe 8 leading to a condenser of any suitable form 9, here indicated conventionally as a coil of pipe 10 within casing 11, through which a cooling medium is circulated through pipes 12 controlled by valves 13. At the bottom of the condenser there is a collection vessel 14 and an enlarged exit pipe 15 controlled by valves 16. The condenser is connected by pipe 17 with a compressor or blower 18, the latter moving the air through pipe 19 to casing 1 at a point adjacent the pulley 2 which is nearest the hopper 5. It is convenient to have a heating apparatus, conventionally indicated as a casing 20, surrounding pipe 19 and adapted to have warm water or exhaust steam pass into it through pipes 21 controlled by valves 211. Adjacent the roll 2, which is nearest the hopper 5, there is preferably located a partition 22.

Adjacent this roll 2 there is also located a guide or stripping roll 23, from which the film passes through a practically gastight slot 24 to outside roll 25, from which it passes to any suitable coiling means, conventionally indicated as a power driven roll 26. As these latter features are well known to those skilled in the art, they do not require further description in detail.

In carrying out my process in this apparatus, by way of illustration, the reaction mixture, such as any one of those shown at the different stages in the Miles patent cited above, is charged through pipe 6 into hopper 5, the pulleys 2 and belt 3 being in motion in the direction indicated by arrows 4. The reaction mixture is then formed from hopper 5 on to the belt 3 in the form of a thin film 28, the speed of belt 3 being correlated with the flowing characteristics of the particular reaction mixture employed, as will be understood by those skilled in the art.

The gaseous vehicle, preferably air, passes over a very large surface of this film, as indicated by arrows 27, the direction of the air current being counter to the movement of the film. In passing over the surface the air takes up large amounts of vapor of acetic values and carries them through pipe 8 to condenser 9. The amount of vapor of acetic values which is condensed at this point depends primarily upon the difference in temperature between the condenser and the atmosphere of casing 1. The condensing temperature is in general kept as low as practical without solidifying the acetic values which are condensed in it. I have found 60° F. to be useful, particularly if there is a very slight amount of water present, because it enables the acetic acid to be condensed in liquid form without clogging the condenser. This temperature, however, is, of course, subject to adjustment in view of the particular material obtained from the vapor, as will be understood by chemists. There are left in the vehicle vapors of acetic values, such as acetic acid, corresponding to the temperature of the condenser. But when this air is brought up to its proper drying temperature and re-enters the casing 1 through pipe 19 the vapors of acetic value in it are sufficiently below the saturation point at the temperature prevailing within casing 1 to avoid interference with the film drying operation. In fact, the presence of this vapor in the re-entering air minimizes the formation of an impervious surface skin on the film which might prevent the rapid passage of vapors out from the body of the film.

The cooled gaseous vehicle is drawn through pipe 17 by the compressor or blower 18. If a compressor is employed, it oftentimes warms up the air sufficiently to permit it to function properly when it passes again into casing 1. When, however, the compressor does not adequately warm the vehicle, or when a blower is employed, it is preferable to reheat the air to the desired temperature, say during its passage through pipe 19, by means of the heating apparatus 20. The most suitable range of temperature to prevail in casing 1 is from 90 to 120° F., 100° F. being very efficient.

The current of gaseous vehicle or air enters the casing 1 from pipe 19 and travels, because of partitions 22 and 7, in the direction of arrows 27 along the surface of the film 28 and in very intimate contact with it. Because of traveling in the opposite direction to the film, the air is in the best condition when it first meets the film to extract the acetic values from the already depleted film. If desired, auxiliary heating coils 30 may be employed, although these are generally unnecessary. They may also be arranged so that the film 28 gets progressively higher in temperature as it solidifies or sets.

The film is finally stripped off of the belt 3 adjacent pulley 2 as it is pulled across roller 23. It is then removed from the casing and coiled up on 26.

While the vapors of acetic values, such as acetic acid, may be absorbed by bubbling the vapor-laden air through a suitable liquid and then separating the values from such liquid, nevertheless I find it preferable to use the condensation method, an example of which is hereinabove given, because it obtains the acetic values in a form practically pure enough for reuse in further acetylation.

The finished film, because of its very large surface, relative to its mass, can be very rapidly treated by liquids in the further steps of manufacture, such as by wash water, or baths, or further hydrolysis, or by solvents. Of course, instead of broad flat films very thin strip forms having large surface, relative to the mass, may be employed, such as threads and filaments.

Having thus described my invention, what I claim as new and desire to secure by Letters Patent is:

1. In the process of manufacturing cellulose acetate, passing a gaseous vehicle into contact with a cellulose acetate reaction mass containing volatile acetic values to take up vapor of said values and recovering the acetic values from said vapor-laden vehicle.

2. In the process of manufacturing cellulose acetate, passing air into contact with the surface of a cellulose acetate reaction mass containing acetic acid to take up vapor of said acid, and condensing acetic acid from said vapor-laden air.

3. In the process of manufacturing cellulose acetate, repeatedly circulating a gaseous vehicle over the surface of a cellulose acetate reaction mass containing volatile acetic values and through a value-removing zone.

4. In the process of manufacturing cellulose acetate, repeatedly circulating air over the surface of a cellulose acetate reaction mixture containing acetic acid to take up vapor of said acid, through a condensing zone for removing acetic acid from said air and through a reheating zone.

5. In the process of manufacturing cellulose acetate, increasing the surface relative to the mass of a body of cellulose acetate reaction mixture containing volatile acetic values, passing a gaseous vehicle into contact with said increased surface to take up the vapor of said values, and removing acetic values from said vapor-laden vehicle.

6. In the process of manufacturing cellulose acetate, forming into long thin strips having a large surface, relative to their mass, a body of cellulose acetate reaction mixture containing volatile acetic values, passing a gaseous vehicle into contact with the surfaces of said strips to take up vapor of said values, and removing acetic values from said vapor-laden vehicle.

7. In the process of manufacturing cellulose acetate, forming into film a cellulose acetate reaction mixture containing volatile acetic values, passing a gaseous vehicle along the surface of said film to take up vapor of said values, and removing acetic values from said vapor-laden vehicle.

8. In the process of manufacturing cellulose acetate, increasing the surface, relative to the mass, of a body of cellulose acetate reaction mixture containing volatile acetic values, repeatedly circulating a gaseous vehicle over said increased surface to take up vapor of said values and through a value-removing zone.

9. In the process of manufacturing cellulose acetate, forming into long thin strips having large surface, relaive to their mass, a body of cellulose acetate reaction mixture containing volatile acetic values, repeatedly circulating a gaseous vehicle over the surfaces of said strips to take up vapor of said values and through a condensing zone to remove vapors of acetic values from said vehicle.

10. In the process of manufacturing cellulose acetate, forming into film a body of cellulose acetate reaction mixture containing volatile acetic values and repeatedly circulating a gaseous vehicle over the surface of said film to take up vapor of said values and through a value-removing zone.

11. In the process of manufacturing cellulose acetate, forming a film of cellulose acetate reaction mixture containing volatile acetic values, passing said film along a defined path, passing a gaseous vehicle along a surface of said film in a direction contrary to the movement thereof to take up vapors of said values and collecting acetic values from said vapor-laden vehicle.

12. In the process of manufacturing cellulose acetate, forming cellulose acetate reaction mixture containing volatile acetic values into a film, passing said film along a defined path, repeatedly circulating a gaseous vehicle along a surface of the film in a direction contrary to the movement thereof to take up vapors of acetic values, and through a value-removing zone.

13. In the process of manufacturing cellulose acetate, forming cellulose acetate reaction mixture containing acetic acid into film, passing said film along a defined path, repeatedly circulating air over the surface of said film in a direction contrary to the movement thereof to take up vapors of said values and through a condensing zone.

14. In the process of manufacturing cellulose acetate, forming cellulose acetate reaction mixture containing volatile acetic values into film, repeatedly circulating a gaseous vehicle over the surface of said film to take up vapor of said values and through a condensing zone to remove values from said vehicle and through a reheating zone.

15. In the process of manufacturing cellulose acetate, forming cellulose acetate reaction mixture containing volatile acetic values into long thin strips to increase the surface, relative to the mass, passing a gaseous vehicle into contact with the surface of said strips to take up vapor of said values to set the same, removing acetic values from said vapor-laden vehicle, and collecting the set strips.

16. In the process of manufacturing cellulose acetate, forming cellulose acetate reaction mixture containing volatile acetic values into film, passing a gaseous vehicle along the surface of said film to take up acetic values, thereby setting said film, removing acetic values from said vapor-laden vehicle, and winding up said film.

17. In the process of manufacturing cellulose acetate, forming cellulose acetate reaction mixture containing volatile acetic values into film, repeatedly circulating a gaseous vehicle over the surface of said film to take up vapor of said values, and through a value-removing zone, and finally winding up the film so produced.

18. In the process of manufacturing cellulose acetate, forming cellulose acetate reaction mixture containing acetic acid into film, passing said film along a defined path, repeatedly circulating air over the surface of said film and through a condensing zone and a reheating zone until the film is set, and winding up the set film.

Signed at Rochester, New York this 13th day of August, 1923.

ROBERT W. COOK.